US009284882B2

(12) United States Patent
Kasuya et al.

(10) Patent No.: US 9,284,882 B2
(45) Date of Patent: Mar. 15, 2016

(54) HYBRID DRIVE DEVICE

(71) Applicant: AISIN AW CO., LTD., Anjo-shi, Aichi-ken (JP)

(72) Inventors: Satoru Kasuya, Nishio (JP); Masashi Kito, Anjo (JP); Yuichi Seki, Okazaki (JP); Ryosuke Kondo, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/361,908

(22) PCT Filed: Feb. 8, 2013

(86) PCT No.: PCT/JP2013/053160
§ 371 (c)(1),
(2) Date: May 30, 2014

(87) PCT Pub. No.: WO2013/118902
PCT Pub. Date: Aug. 15, 2013

(65) Prior Publication Data

US 2014/0326105 A1 Nov. 6, 2014

(30) Foreign Application Priority Data

| | | |
|---|---|---|
| Feb. 10, 2012 | (JP) | 2012-027850 |
| Feb. 10, 2012 | (JP) | 2012-027851 |
| Jul. 13, 2012 | (JP) | 2012-158159 |

(51) Int. Cl.
*B60K 6/20* (2007.10)
*F02B 63/04* (2006.01)
(Continued)

(52) U.S. Cl.
CPC ................ *F02B 63/042* (2013.01); *B60K 6/26* (2013.01); *B60K 6/387* (2013.01); *B60K 6/40* (2013.01);
(Continued)

(58) Field of Classification Search
CPC .. B60K 6/48; B60K 2006/4825; F16H 3/089; F16H 59/02
USPC ................................................ 74/661, 730.1
See application file for complete search history.

(56) References Cited

U.S. PATENT DOCUMENTS 8,555,748 B2 * 10/2013 Maekawa et al. ........... 74/665 A
8,622,182 B2 * 1/2014 Iwase et al. ................. 192/3.33
(Continued)

FOREIGN PATENT DOCUMENTS

DE 10 2009 042 933 A1 5/2010
JP A-2004-1708 1/2004
(Continued)

OTHER PUBLICATIONS

International Search Report issued in International Patent Application No. PCT/JP2013/053159 dated May 7, 2013.
(Continued)

*Primary Examiner* — Ha D Ho
(74) *Attorney, Agent, or Firm* — Oliff PLC

(57) ABSTRACT

A hybrid drive device having a clutch that engages and disengages an output member of an internal combustion engine and an input shaft of an automatic transmission device with and from each other. A rotary electric machine has a stator fixed to a case and a rotor coupled to the input shaft of the automatic transmission device. The rotary electric machine is disposed radially outwardly of the clutch so as to at least partially overlap the clutch in an axial direction as seen from a radial direction. Lubricating oil is supplied from the input shaft of the automatic transmission device to the clutch and the hybrid drive device includes a shield portion that allows the lubricating oil to bypass the rotary electric machine and leads the lubricating oil supplied to the clutch to an oil reservoir.

11 Claims, 9 Drawing Sheets

(51) Int. Cl.

| | |
|---|---|
| ***B60K 6/26*** | (2007.10) |
| ***B60K 6/48*** | (2007.10) |
| ***B60K 6/54*** | (2007.10) |
| ***F16D 25/12*** | (2006.01) |
| ***B60K 6/387*** | (2007.10) |
| ***B60K 6/40*** | (2007.10) |
| ***F16H 57/04*** | (2010.01) |
| *F16D 25/0638* | (2006.01) |

(52) U.S. Cl.

CPC ... *B60K 6/48* (2013.01); *B60K 6/54* (2013.01); *F16D 25/123* (2013.01); *F16H 57/0476* (2013.01); *F16D 25/0638* (2013.01); *Y02T 10/6221* (2013.01); *Y10T 74/19014* (2015.01)

(56) References Cited

U.S. PATENT DOCUMENTS

| | | | | |
|---|---|---|---|---|
| 8,632,438 | B2 * | 1/2014 | Kuroda et al. | 477/5 |
| 2004/0214686 | A1 | 10/2004 | Katou | |
| 2005/0151429 | A1 | 7/2005 | Taketsuna et al. | |
| 2008/0011529 | A1 | 1/2008 | Hoher et al. | |
| 2009/0008212 | A1 | 1/2009 | Combes et al. | |
| 2009/0283344 | A1 * | 11/2009 | Arnold et al. | 180/65.22 |
| 2010/0109461 | A1 | 5/2010 | Kato et al. | |
| 2011/0121692 | A1 * | 5/2011 | Iwase et al. | 310/67 R |
| 2011/0240431 | A1 * | 10/2011 | Iwase et al. | 192/3.29 |
| 2012/0032538 | A1 | 2/2012 | Kasuya et al. | |
| 2012/0080248 | A1 | 4/2012 | Kasuya et al. | |
| 2012/0080286 | A1 | 4/2012 | Kasuya et al. | |
| 2012/0319514 | A1 * | 12/2012 | Iwase et al. | 310/78 |

FOREIGN PATENT DOCUMENTS

| | | | |
|---|---|---|---|
| JP | A-2004-324818 | | 11/2004 |
| JP | 2006-248417 | A | 9/2006 |
| JP | A-2006-298272 | | 11/2006 |
| JP | A-2008-501566 | | 1/2008 |
| JP | A-2008-24298 | | 2/2008 |
| JP | A-2009-1127 | | 1/2009 |
| JP | A-2009-72052 | | 4/2009 |
| JP | A-2009-261214 | | 11/2009 |
| JP | A-2010-105615 | | 5/2010 |
| JP | A-2010-196868 | | 9/2010 |
| JP | A-2010-276035 | | 12/2010 |
| JP | A-2011-105192 | | 6/2011 |
| JP | A-2011-152814 | | 8/2011 |
| JP | A-2011-213230 | | 10/2011 |
| JP | A-2011-214595 | | 10/2011 |
| KR | 10-2009-0040543 | A | 4/2009 |
| KR | 10-2010-0008470 | A | 1/2010 |
| WO | 2004/019468 | A | 3/2004 |
| WO | WO 2008/025691 | A1 | 3/2008 |
| WO | WO 2012/017770 | A1 | 2/2012 |
| WO | WO 2012/039378 | A1 | 3/2012 |

OTHER PUBLICATIONS

International Search Report issued in International Patent Application No. PCT/JP2013/053157 dated May 7, 2013.

International Search Report issued in International Patent Application No. PCT/JP2013/053160 dated May 7, 2013.

U.S. Appl. No. 13/762,839, filed Feb. 8, 2013 in the name of Kasuya et al.

U.S. Appl. No. 14/361,435, filed May 29, 2014 in the name of Kasuya et al.

* cited by examiner $20_3$
23
22
21
3
4a
50
47
5a
S
A
51
50
53
B
24
6
7

22
50
51
55
56
53

20₄
23
21
22
3
50
51
47
71
55
S
A
53
B
24
6

22
50
51
71
55
56
53

HYBRID DRIVE DEVICE

TECHNICAL FIELD

The present invention pertains to a hybrid drive device that has an internal combustion engine and an electric motor (rotary electric machine) as drive sources, and in particular relates to circulation of lubricating (cooling) oil in a one-motor hybrid drive device that transfers power from an internal combustion engine to an automatic transmission device via an engine disconnecting (K0) clutch.

BACKGROUND ART

There has conventionally been devised a one-motor hybrid drive device in which an output shaft (member) of an internal combustion engine is coupled to an input shaft (member) of an automatic transmission device via a K0 clutch and in which a rotor of an electric motor is coupled to the automatic transmission device. In general, the hybrid drive device starts the vehicle using the drive force of the electric motor, engages the K0 clutch when the vehicle is at a predetermined low speed to start the engine, and drives the vehicle using the drive force of the engine while performing shifting in the automatic transmission device. In this event, the electric motor outputs power so as to assist the drive force of the engine, generates electric power using the drive force of the engine or the inertial force of the vehicle, or idles.

In the case where the charge amount (SOC) of a battery is insufficient, the vehicle is started using power of the internal combustion engine. In this event, the K0 clutch functions as a starting clutch. When the engine is started by the electric motor and when the vehicle is started by the engine, the K0 clutch is subjected to slip control in order for a shock due to abrupt torque fluctuations between the input side and the output side of the K0 clutch to be avoided.

In the hybrid drive device, the electric motor is a large-diameter hollow motor, and the K0 clutch is disposed in the radially inner portion of the rotor of the motor to achieve downsizing and improve the efficiency of the electric motor. Lubricating oil is supplied from the input shaft of the automatic transmission device to the K0 clutch. After lubricating and cooling the K0 clutch, the lubricating oil flows toward a coil end of the electric motor (see Patent Document 1).

In some hybrid drive devices, the clutch is lubricated by a full-dip method. That is, the K0 clutch is housed in a liquid-tight unit housing, the housing is filled with lubricating oil, and the lubricating oil in the housing is circulated through a lubricating oil passage that passes by way of an oil cooler (see Patent Document 2).

RELATED-ART DOCUMENTS

Patent Documents

[Patent Document 1] Korean Patent Application Publication No. 10-2010-0008470

[Patent Document 2] Japanese Patent Application Publication No. 2010-196868 (JP 2010-196868 A)

SUMMARY OF THE INVENTION

Problem to be Solved by the Invention

A sufficient amount of lubricating oil is required to suppress heat generated from the K0 clutch during the slip control. In the case where the vehicle is started by the engine, in particular, it is necessary that the K0 clutch should be subjected to slip control for a relatively long time in order to generate creep torque before the vehicle is started. In the technology according to Patent Document 1, lubricating oil becomes hot through lubrication during the slip control for the K0 clutch. When the hot lubricating oil flows to the coil end of the electric motor, the coil end may not be cooled well.

In the technology according to Patent Document 2, even if lubricating oil becomes hot through the slip control for the K0 clutch, the hot lubricating oil does not flow directly to the electric motor. In full-dip lubrication, however, the K0 clutch may not be cooled sufficiently because of the slip control, and drag of the clutch may be increased.

It is therefore an object of the present invention to provide a hybrid drive device that addresses the foregoing issues, in which the clutch is lubricated and cooled by causing lubricating oil to flow to the clutch through axial core lubrication, and in which the lubricating oil used for the clutch does not directly flow to the rotary electric machine (electric motor).

Means for Solving the Problem

The present invention provides a hybrid drive device (1) characterized by including:

a clutch (6) that engages and disengages an output member (5*a*) of an internal combustion engine (5) and an input shaft (7) of an automatic transmission device (2) with and from each other; and a rotary electric machine (3) that has a stator (24) fixed to a case (23) and a rotor (25) coupled to the input shaft (7) of the automatic transmission device (2), in which:

the rotary electric machine (3) is disposed radially outwardly of the clutch (6) so as to at least partially overlap the clutch (6) in an axial direction as seen from a radial direction;

lubricating oil is supplied from the input shaft (7) of the automatic transmission device to the clutch (6); and the hybrid drive device includes a shield portion (50, 51) (187) that allows the lubricating oil to bypass the rotary electric machine (3) and leads the lubricating oil supplied to the clutch to an oil reservoir (66) (166).

With reference to FIG. 2, for example, the hybrid drive device further includes:

a rotor support member (26) that supports the rotor (25) and that has an oil hole (47) through which the lubricating oil supplied to the clutch (6) flows out; and a discharge passage (53) through which the lubricating oil flowing out through the oil hole (47) is discharged to the oil reservoir (66), and the lubricating oil flowing out through the oil hole (47) bypasses the rotary electric machine (3) and is discharged to the oil reservoir (66) through the shield portion (50, 51) and the discharge passage (53).

With reference to FIG. 2, for example, the rotor support member (26) has a cylindrical portion (26*a*) to which the rotor (25) is mounted, and first and second flange portions (26*b*) (28) that extend in a radially inner direction from the cylindrical portion, the first flange portion (26*b*) having the oil hole (47) formed in a radially outer portion thereof;

a clutch chamber (S) that houses the clutch (6) is formed between the first and second flange portions (26*b*) (28) of the rotor support member; and lubricating oil is supplied from the input shaft (7) toward the clutch chamber.

With reference to FIG. 3, for example, the hybrid drive device further includes a valve (61) that switches a flow rate of lubricating oil to be supplied to the clutch (6) between a high flow rate and a low flow rate, and the oil hole (47) in the rotor support member (26) is set such that lubricating oil flows out through the oil hole (47) at a flow rate that is lower than the high flow rate and higher than the low flow rate.

With reference to FIGS. 2, 5, and 6, for example, the shield portion (50, 51) has an annular flanged portion (50) that projects in the axial direction from the case (22), and a projection (51) provided at a distal end of the flanged portion in at least a lower portion of the flanged portion to project in a radially inner direction so as to be proximate to a distal end of the cylindrical portion (26*a*) of the rotor support member (26).

The projection (51) is disposed radially outwardly of the distal end of the cylindrical portion (26*a*) of the rotor support member (26) so as to at least partially overlap the distal end of the cylindrical portion of the rotor support member as seen from the radial direction.

With reference to FIG. 2, for example, the shield portion (50, 51) has an annular shape, and a space (A) defined by the shield portion, the rotor support member (26), and the case (22) is formed; and the discharge passage (53) is formed in the case (22) with an upper end of the discharge passage opening (53*a*) in a bottom portion of the space (A), and lubricating oil flowing into the space (A) through the oil hole (47) flows into the discharge passage (53) through the opening (53*a*).

With reference to FIG. 5, for example, the shield portion has a flanged portion (50) integrally formed with the case (22), and ribs (70) formed to extend radially inwardly of the flanged portion.

With reference to FIG. 8, for example, the hybrid drive device further includes a rotor support member (126) that has a cylindrical portion (126*a*) that holds the rotor, a flange portion (126*b*) that extends radially inwardly from the cylindrical portion, and a hub portion (126*c*) supported on the case (123, 122) via a bearing (130) at a radially inner end portion of the flange portion, and the clutch (6) is disposed on one side of the flange portion (126*b*) in the axial direction and radially inwardly of the cylindrical portion (126*a*);

the shield portion is a cover member (187) that covers a coil end (24*a*) disposed on one side of the stator (24); and lubricating oil from the input shaft (7) is blocked by the flange portion (126*b*) and supplied to the clutch (6), and further led by the cylindrical portion (126*a*) and the cover member (187) to be discharged to the oil reservoir (166).

With reference to FIG. 8, for example, the clutch (6) has a clutch drum (128) coupled to the input shaft (7), a clutch hub (137) coupled to the output member (5*a*), outer friction plates (135*a*) splined to the clutch drum (128), inner friction plates (135*b*) splined to the clutch hub (137), and a hydraulic servo (136) disposed in the clutch drum to engage and disengage the outer friction plates and the inner friction plates with and from each other;

an outer peripheral surface of the clutch drum (128) is formed with splines (128*c*) and a through hole (128*d*), and the cylindrical portion (126*a*) of the rotor support member is engaged with the clutch drum through the splines (128*c*) so as to rotate together with the clutch drum; and lubricating oil from the input shaft (7) flows out of the clutch drum (128) through a gap (E) between a distal end of the clutch drum and the flange portion, the splines (128*c*), and the through hole (128*d*), and is further led by the cover member (187) to be discharged to the oil reservoir (166).

With reference to FIGS. 3 and 4, for example, the hybrid drive device further includes a valve (61) that switches a flow rate of lubricating oil to be supplied to the clutch (6) between a high flow rate and a low flow rate, and the clutch (6) is controlled to a disengaged state, a slip state, and a completely engaged state; and the valve (61) is switched to the low flow rate when the clutch is in the disengaged state and the completely engaged state, and to the high flow rate when the clutch is in the slip state.

The symbols in the above parentheses are provided for reference to the drawings, and should not be construed as affecting the scope of the claims in any way.

Effects of the Invention

According to the invention of claim 1, lubricating oil from the input shaft is supplied to the clutch, and flows out. Thus, the cooling performance for the clutch is secured, and drag of the clutch is reduced. Further, the lubricating oil having lubricated and cooled the clutch is led by the shield portion, and discharged to the oil reservoir at the lower portion of the case while bypassing the rotary electric machine. Thus, even if the clutch is subjected to slip control and lubricating oil becomes hot, it is possible to prevent the hot lubricating oil from directly flowing to the stator of the rotary electric machine, making the stator hot, and then degrading the performance and the durability of the electric motor.

According to the invention of claim 2, lubricating oil supplied from the input shaft and having lubricated and cooled the clutch flows out through the oil hole formed in the rotor support member, and is blocked by the shield portion and discharged to the oil reservoir through the discharge passage, and does not directly flow to the rotary electric machine.

According to the invention of claim 3, the clutch is housed in the clutch chamber surrounded by the cylindrical portion and the first and second flange portions of the rotor support member. Thus, lubricating oil from the input shaft is reliably supplied to the friction plates of the clutch in the clutch chamber. In addition, the oil hole is formed in the radially outer portion of the first flange portion. Thus, lubricating oil having lubricated the clutch is reliably discharged through the oil hole. This makes it possible to maintain the accuracy of the clutch by reliably lubricating and cooling the clutch, and to decrease drag torque due to lubricating oil generated when the clutch is disengaged.

According to the invention of claim 4, the valve switches the flow rate of lubricating oil to be supplied to the clutch between the high flow rate and the low flow rate with respect to the amount of lubricating oil flowing out through the oil hole. Thus, the clutch can be lubricated and cooled with high accuracy by switching between a state close to full-dip lubrication in which the clutch is dipped in lubricating oil reserved in the clutch chamber and a lubrication state in which lubricating oil flows out through the oil hole.

According to the invention of claim 5, the shield portion has the flanged portion formed on the case, and the projection provided at the distal end of the flanged portion to project in the radially inner direction. The projection is proximate to the distal end of the cylindrical portion of the rotor support member, which makes it possible to lead lubricating oil flowing along the cylindrical portion to the shield portion, and to block lubricating oil flowing from the case side to the electric motor side to reliably lead and discharge lubricating oil to the discharge passage.

According to the invention of claim 6, the projection at least partially overlaps the distal end of the cylindrical portion of the rotor support member as seen from the radial direction.

Thus, lubricating oil is hindered from flowing toward the rotary electric machine because of a centrifugal force or the gravity.

According to the invention of claim 7, the shield portion has the annular shape, and the space defined by the shield portion, the rotor support member, and the case is formed. Thus, lubricating oil flowing out through the oil hole is reserved in the space to be reliably discharged through the discharge passage which opens in the bottom portion of the space.

According to the invention of claim 8, the shield portion has the flanged portion integrally formed with the case, and the flanged portion is reinforced by ribs. Thus, the rigidity of the shield portion can be enhanced to improve the reliability.

According to the invention of claim 9, lubricating oil from the input shaft is blocked by the rotor support member, supplied to the clutch, and further discharged toward the electric motor on the radially outer side. Thus, the cooling performance for the clutch is secured, and drag of the clutch is reduced. In addition, the lubricating oil having cooled the clutch and discharged toward the electric motor is discharged to the oil reservoir while bypassing the coil end disposed on one side of the stator because of the cover which covers the coil end.

According to the invention of claim 10, lubricating oil from the input shaft is blocked by the flange portion of the rotor support member, and smoothly flows out of the clutch drum through the gap between the distal end of the clutch drum and the flange portion, the splines on the outer peripheral surface of the clutch drum, and the through hole. This makes it possible to decrease drag and cool the clutch.

According to the invention of claim 11, in the case where the clutch is in the disengaged or completely engaged state, lubricating oil is supplied at the low flow rate to reduce an energy loss by decreasing generation of drag torque or the like. When the clutch is in the slip state, lubricating oil is supplied at the high flow rate to reliably lubricate and cool the clutch. This prevents the clutch from becoming hot, and improves the performance and the durability of the clutch. Further, even if hot lubricating oil flows out in this state, the shield portion prevents the lubricating oil from flowing to the stator coil, which makes it possible to maintain the cooling performance for the electric motor.

BRIEF DESCRIPTION OF THE DRAWINGS

FIG. 2 illustrates an input portion (an electric motor and a disconnecting clutch) according to an embodiment of the present invention, in which

FIG. 5 illustrates an input portion according to a partially modified version of the embodiment, in which

FIG. 6 illustrates an input portion according to a partially modified version of the embodiment, in which

FIG. 7 illustrates an input portion according to a partially modified version of the embodiment, in which

MODES FOR CARRYING OUT THE INVENTION

Figure 1:
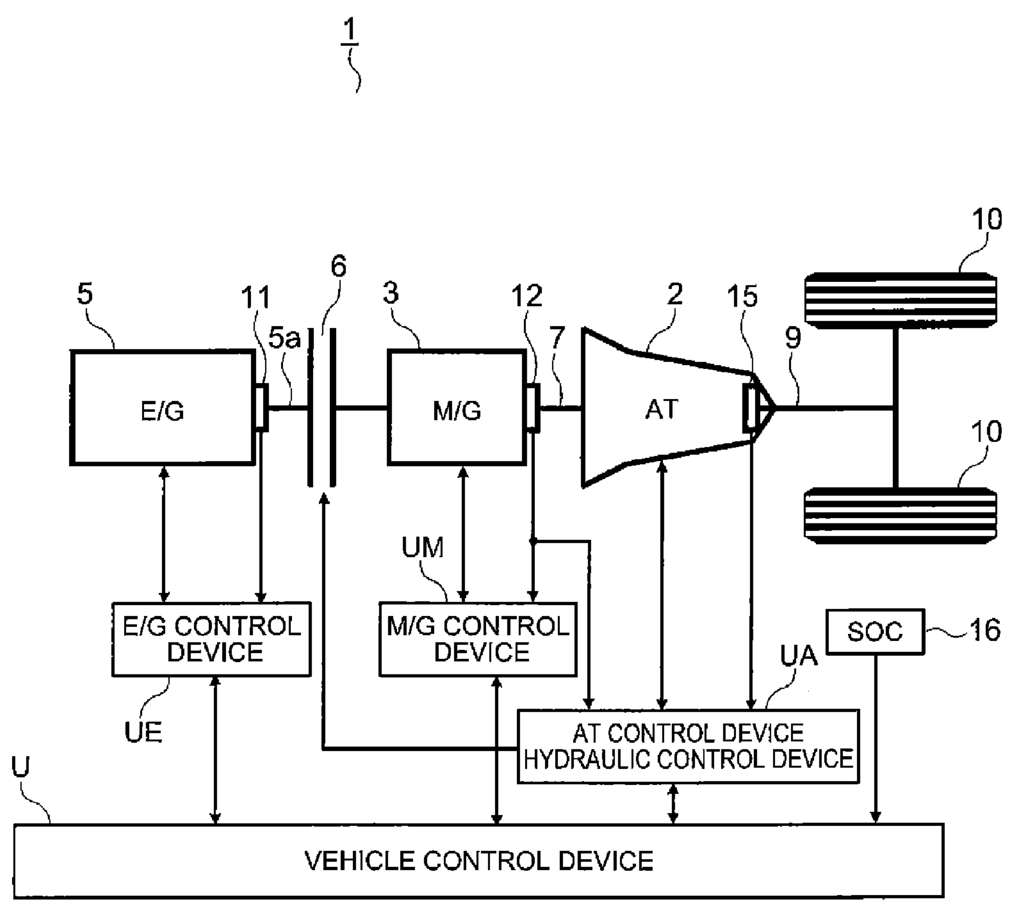
FIG. 1 is a schematic diagram illustrating a hybrid drive device to which the present invention can be applied.

An embodiment of the present invention will be described below with reference to the drawings. As illustrated in FIG. 1, a hybrid drive device 1 is a so-called one-motor type including an automatic transmission device 2, a rotary electric machine (hereinafter referred to as an electric motor) 3, and a disconnecting clutch 6 (hereinafter referred to as a K0 clutch) disposed between a rotary portion (rotor) of the electric motor 3 and an output shaft (coupling shaft) 5*a* of an internal combustion engine 5. An input member (hereinafter referred to as an input shaft) 7 of the automatic transmission device 2 is coupled to the rotary portion of the electric motor 3. An output member (hereinafter referred to as an output shaft) 9 of the automatic transmission device 2 is connected to drive wheels 10. The internal combustion engine 5, the electric motor 3, and the automatic transmission device 2 (including the K0 clutch 6) are controlled by an engine (E/G) control device UE, a motor (M/G) control device UM, and an automatic transmission/hydraulic (AT) control device UA, respectively. The control devices UE, UM, and UA are integrally controlled by a vehicle control device U. Signals from an engine rotational speed sensor 11, a rotational speed sensor 12 that senses the rotational speed of the electric motor and the input shaft 7 of the automatic transmission device, and an output shaft rotational speed sensor 15 are input to the control devices UE, UM, and UA. Further, a battery remaining amount (SOC) signal 16 is input to the vehicle control device U.

The electric motor (rotary electric machine) 3 functions as a drive source that converts electric energy into mechanical energy, as a generator that converts mechanical energy into electric energy, and further as a starter that starts the engine. The automatic transmission device 2 is a multi-speed transmission device with eight forward speeds and one reverse speed, for example. However, the automatic transmission device 2 is not limited thereto, and may be a continuously variable automatic transmission device such as a belt-type CVT, a cone ring-type CVT, and a toroidal-type CVT. The rotary electric machine may have only one of the functions as a drive source and a generator.

Figure 2A:
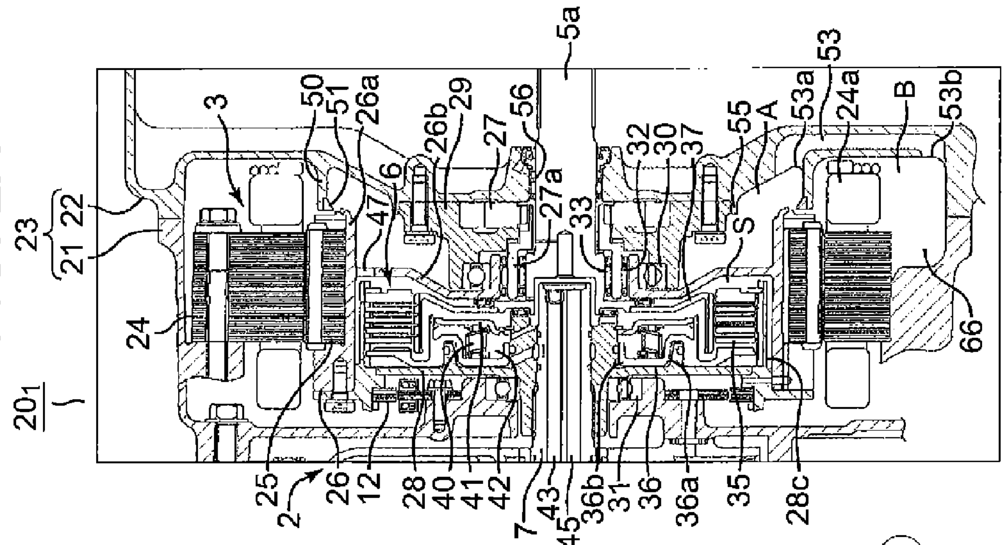
FIG. 2A is a sectional view and FIG. 2B is a side view of a case.

Next, an input portion composed of the K0 clutch 6 and the electric motor 3 will be described with reference to FIG. 2. An input portion $\mathbf{20}_1$ is housed in a combined case 23 composed of a transmission case 21 of the automatic transmission device 2 and a motor cover 22. The electric motor 3 is a large-diameter hollow motor, and includes a stator 24 integrally fixed to the case 23, and a rotor 25 as its rotary portion integrally provided to a rotor support member 26. The stator 24 is formed by winding a coil around an iron core. A coil end 24*a* of the coil projects from the iron core in the width direction (a direction that is parallel to the rotational axis). The rotor support member 26 has a cylindrical portion 26*a*, to the radially outer side of which the rotor 25 is mounted, and a (first) flange portion 26*b* that extends in the radially inner direction from the cylindrical portion. A flange member (second flange portion) 28 is integrally fixed to an end surface of the cylindrical portion 26*a* on the automatic transmission device side. The rotor support member 26 is supported at two points by the (first) flange portion 26*b* and the (second) flange portion (member) 28. The K0 clutch 6 is disposed in a space S between the flange portion 26*b* and the flange member 28. The space S forms a clutch chamber that houses the clutch 6.

A pump case 29 that accommodates a pump 27 is integrally fixed to the motor cover 22 constituting the case 23. A hub formed at the radially inner end of the (first) flange portion 26*b* is supported by the pump case 29 so as to be rotatable through a bearing 30. An output member (hereinafter referred to as an output shaft 5*a*) that rotates together with the output shaft 5*a* of the internal combustion engine 5 is oil-tightly and rotatably supported by the motor cover 22. The input shaft 7 of the automatic transmission device 2 is rotatably supported by the transmission case 21 constituting the case 23. The shafts 5*a* and 7 are disposed coaxially with their respective distal ends facing each other. A hub formed at the radially inner end of the flange member 28 constituting the second flange portion is supported so as to be rotatable through a bearing 31 on the outer peripheral side of the hub.

One-way clutch 32 is interposed between an input portion 27*a* of the pump 27 and the hub of the flange portion 26*b* on the outer peripheral side of the input portion 27*a*. One-way clutch 33 is interposed between the input portion 27*a* and the engine output shaft 5*a* on the inner peripheral side of the input portion 27*a*. The faster one of rotation of the flange portion 26*b* and rotation of the engine output shaft 5*a* is transferred to the pump input portion 27*a*. Thus, the pump 27 is driven by one of the electric motor 3 and the internal combustion engine 5 serving as the vehicle drive sources.

The K0 clutch 6 housed in the clutch chamber S is composed of inner friction plates and outer friction plates composed of multiple plates 35, and a hydraulic servo 36. The inner friction plates of the multiple plates 35 are engaged with a clutch hub 37 that are engaged with the distal end portion of the engine output shaft 5*a* to rotate together with the engine output shaft 5*a*. The outer friction plates are engaged with a clutch drum 28*c* formed on the flange member 28. A cylinder 36*a* of the hydraulic servo 36 is formed on the flange member 28. A piston 36*b* is oil-tightly fitted in the cylinder. The piston 36*b* extends in the radially outer direction to actuate the multiple plates 35 of the clutch 6. A return spring 40 acts on the back surface side of the piston 36*b*. The spring 40 is provided in a contracted state between the back surface side of the piston and a back plate 41 retained on the hub of the flange member 28 and oil-tightly fitted with the back surface side of the piston. A cancellation oil chamber 42 is formed between the back surface of the piston and the back plate 41.

A lubricating oil passage 43 and a lubricating oil passage 45 that extend from a valve body constituting a hydraulic control device are formed along the axial direction of the input shaft 7 of the automatic transmission device. The lubricating oil passage 43 has a closed distal end, and is led to the cancellation oil chamber 42 and led to the clutch chamber S to supply lubricating oil to the multiple friction plates 35 of the clutch 6. The lubricating oil passage 45 has an open distal end, and supplies lubricating oil to the one-way clutches 32 and 33 and so forth via an oil hole in the output shaft 5*a*. Working oil is supplied to and discharged from the hydraulic servo 36 via a separate oil passage. An oil hole 47 is formed adjacent to the cylindrical portion 26*a* at the radially outer end of the flange portion 26*b*. The oil hole 47 is formed such that lubricating oil led from the lubricating oil passage 45 to the clutch chamber S is discharged from the clutch chamber S, that is, formed at least at a position on the radially outer side of a contact surface of the multiple friction plates 35 of the clutch 6 such that lubricating oil is discharged from the contact surface.

Lubricating oil from the oil hole 47 flows out toward a space A between the flange portion 26*b* and the motor cover 22. An annular flanged portion 50 is integrally formed with the motor cover 22 to extend in a direction toward the space A. The distal end of the flanged portion 50 extends so as to be close to the distal end of the cylindrical portion 26*a* of the rotor support member 26. The flanged portion 50 constitutes a shield portion that separates the space A and a motor chamber B that houses the electric motor 3. Further, a projection member (projection) 51 is integrally mounted to the distal end of the flanged portion 50 to project in the radially inner direction so as to be proximate to the distal end of the cylindrical portion 26*a*. The projection member 51 constitutes the shield portion in cooperation with the flanged portion 50. The projection member 51 is disposed so as to at least partially overlap the distal end of the cylindrical portion 26*a* of the rotor support member 26 as seen from a radial direction. The shield portions 50 and 51 block an inflow of lubricating oil from the space A toward the stator 24 (the coil end 24*a* thereof) in the motor chamber B. The front and rear surfaces of the space A are defined by the flange portion 26*b* and the motor cover 22. The radially inner side of the space A is defined by the pump case 29. Further, the radially outer side of the space A is defined by the cylindrical portion 26*a* and the shield portions 50 and 51, which are disposed in proximity to each other. Lubricating oil discharged through the oil hole 47 is reserved in the space A.

A discharge passage 53 is formed in the motor cover 22 at the bottom portion of the space A. The upper end of the discharge passage 53 opens (53*a*) in the bottom portion of the space A adjacent to the flanged portion 50. The lower end of the discharge passage 53 opens (53*b*) in an oil reservoir 66 at the bottom portion of the case 23. The discharge passage 53 constitutes a bypass oil passage through which lubricating oil in the space A is discharged to the oil reservoir 66 at the bottom portion of the case while bypassing the stator 24 of the electric motor 3, in particular the coil end 24*a*.

Figure 2B:
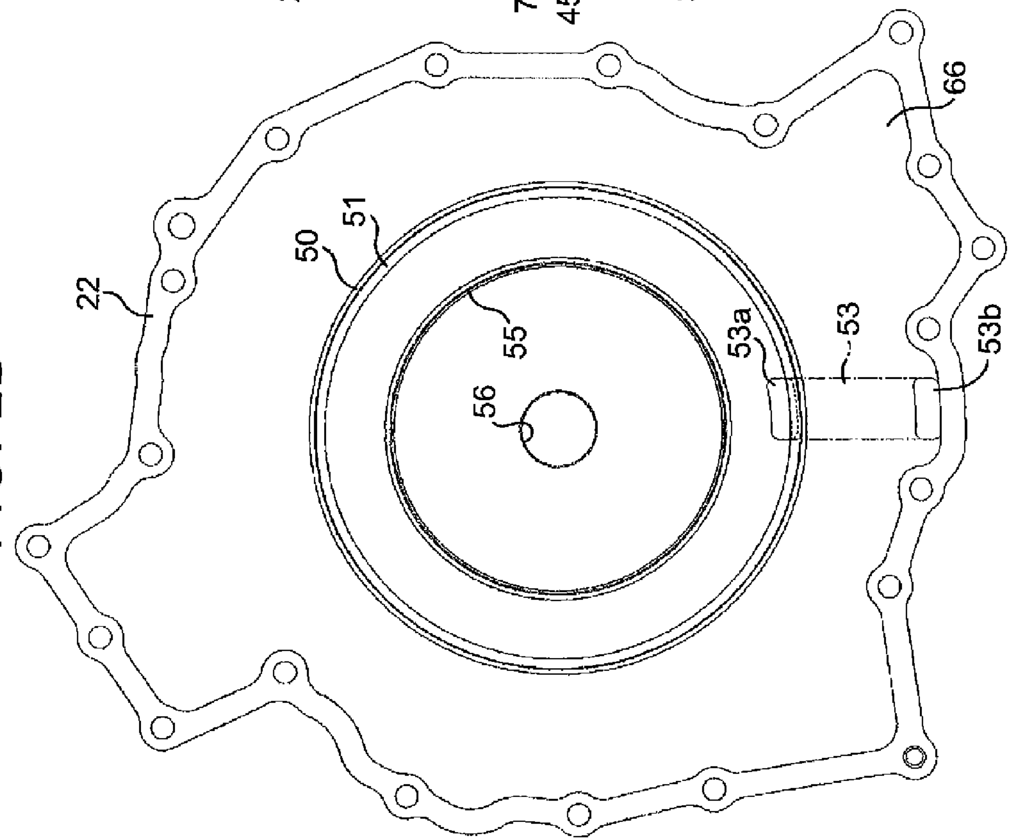

FIG. 2B is a side view of the motor cover 22 as seen from the mating surface. In the drawing, reference numeral 50 denotes the flanged portion, and 51 denotes the projection member mounted to the flanged portion. Reference numeral 55 denotes a spigot portion to be fitted with the pump case 29, and 56 denotes a hole for insertion of the output shaft 5*a*. Reference numeral 53 denotes the discharge passage constituting the bypass oil passage, 53*a* denotes the opening of the discharge passage on the space A side, and 53*b* denotes the opening of the discharge passage on the motor chamber B side.

Figure 3:
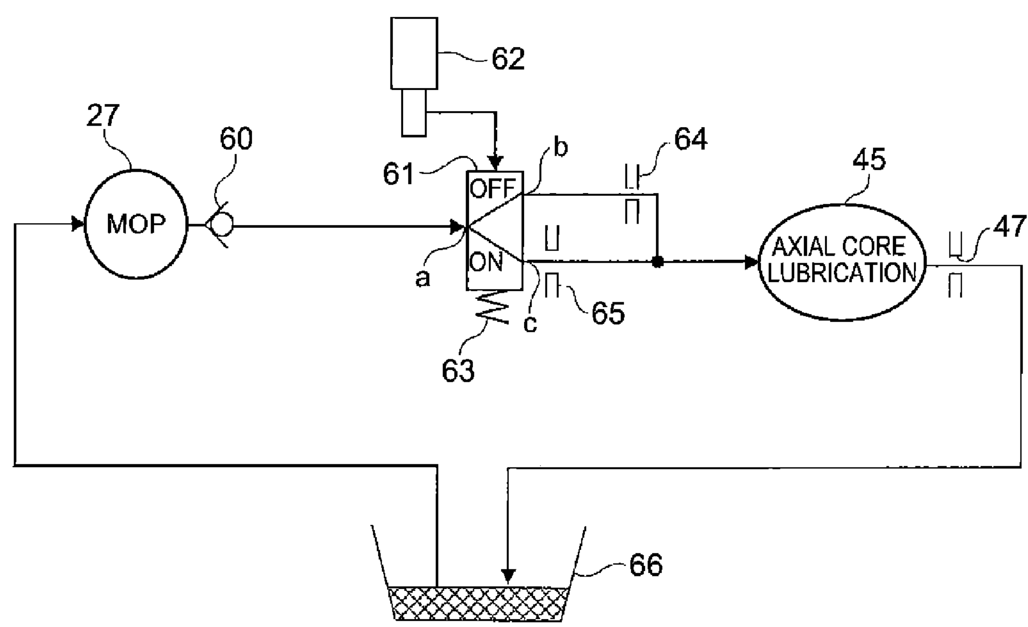
FIG. 3 illustrates a mechanism for switching the flow rate of lubricating oil.

Next, a device that supplies lubricating oil to the lubricating oil passage (axial core lubrication) 45 will be described with reference to FIG. 3. Lubricating oil discharged by rotation of the oil pump 27 is led to an input port a of a switching valve 61 via a check valve 60. The switching valve 61 is operated by a solenoid valve 62. In an ordinary (normal) state, the input port a is communicated with a first output port b by a spring 63. When the solenoid valve 62 is turned on, the input port a is switched to be communicated with a second output port c. Lubricating oil from the first output port b is supplied to the lubricating oil passage (axial core lubrication) 45 via a low-flow rate orifice 64. Lubricating oil from the second output port c is supplied to the lubricating oil passage (axial core lubrication) 45 via a high-flow rate orifice 65. Then, axial core lubrication from the oil passage 45 is supplied to the clutch chamber S as discussed earlier to lubricate and cool the multiple friction plates 35 of the clutch 6, thereafter discharged to the space A via the oil hole 47 formed in the flange portion 26*b*, and further returned to the oil reservoir 66 at the lower portion of the case 23 via the discharge passage 53.

The hole diameter of the oil hole 47 is set to be larger than the hole diameter of the low-flow rate orifice 64, and to be smaller than the hole diameter of the high-flow rate orifice 65. Thus, the flow rate of lubricating oil supplied via the low-flow rate orifice 64 is lower than the flow rate of lubricating oil flowing out through the oil hole 47 so that lubricating oil is not accumulated in the clutch chamber S. The flow rate of lubricating oil supplied via the high-flow rate orifice 65 is higher than the flow rate of lubricating oil flowing out through the oil hole 47 so that lubricating oil is accumulated in the clutch chamber S, which allows the multiple friction plates 35 of the clutch 6 to be lubricated and cooled in a substantially fully dipped state.

Next, the effect of the embodiment discussed above will be described. At normal times, when the battery remaining amount (SOC) is not insufficient, the hybrid drive device 1 starts the vehicle using the electric motor 3 as the drive source. That is, the vehicle is in the stationary state with a shift lever in a D (drive) range and with the automatic transmission device 2 establishing the first speed, and the electric motor 3 is in a creep state in which the electric motor 3 generates creep torque. When a driver depresses an accelerator pedal in this state, the electric motor 3 generates torque matching the accelerator operation amount. Torque of the electric motor 3 is transferred to the drive wheels 10 via the automatic transmission device 2 to start the vehicle. In this event, the K0 clutch 6 is in the disengaged state. Then, when the vehicle reaches a predetermined speed, the K0 clutch 6 is engaged to start the internal combustion engine 5 using torque of the electric motor 3. With the engine 5 started, rotation of the engine output shaft 5*a* is transferred to the drive wheels 10 via the automatic transmission device 2, and the vehicle speed is increased to a cruising speed by upshifting the automatic transmission device 2. In this event, the electric motor 3 outputs power so as to assist the engine torque, generates (regenerates) electric power using the engine torque or the inertial force of the vehicle, or rotates with no load.

When the vehicle is driven by the electric motor 3, rotation of the rotor 25 of the electric motor is transferred to the pump input portion 27*a* via the flange portion 26*b* and the one-way clutch 32, and the pump 27 generates a hydraulic pressure. The hydraulic pressure from the pump 27 is supplied from the lubricating oil passage 45 toward the clutch chamber S by way of the input port a and the output port b of the switching valve 61 in the off state and the low-flow rate orifice 64. Then after the multiple friction plates 35 of the clutch 6 are lubricated by a low flow rate of lubricating oil, the lubricating oil flows into the space A through the oil hole 47, and is further returned to the oil reservoir 66 at the lower portion of the case via the discharge passage 53.

The hydraulic pressure from the pump 27 is supplied from the lubricating oil passage 43 to the hydraulic servo 36 as a working oil pressure to engage the clutch 6 and start the engine 5. In this event, in order for generation of a shock to be suppressed, the clutch 6 is preferably subjected to slip control. After being subjected to slip control, the clutch 6 is completely engaged through the axial core lubrication. In this event, although the axial core lubrication is performed at a low flow rate, the clutch 6 does not become excessively hot because the time for the slip control is short and the oil does not become excessively hot.

Then, when the internal combustion engine 5 is started and the vehicle is driven by the internal combustion engine, rotation of the engine output shaft 5*a* becomes higher than rotation of the electric motor 3. The power transfer to the pump drive shaft 27*a* is switched from the one-way clutch 32 on the outer side to the one-way clutch 33 on the inner side, and the pump 27 is driven by the engine output shaft 5*a*. Also in this state, lubricating oil is supplied via the low-flow rate orifice 64. Thus, oil is not accumulated in the clutch chamber S, and drag torque which is generated on the clutch even if the clutch 6 is disengaged can be decreased.

Figure 4:
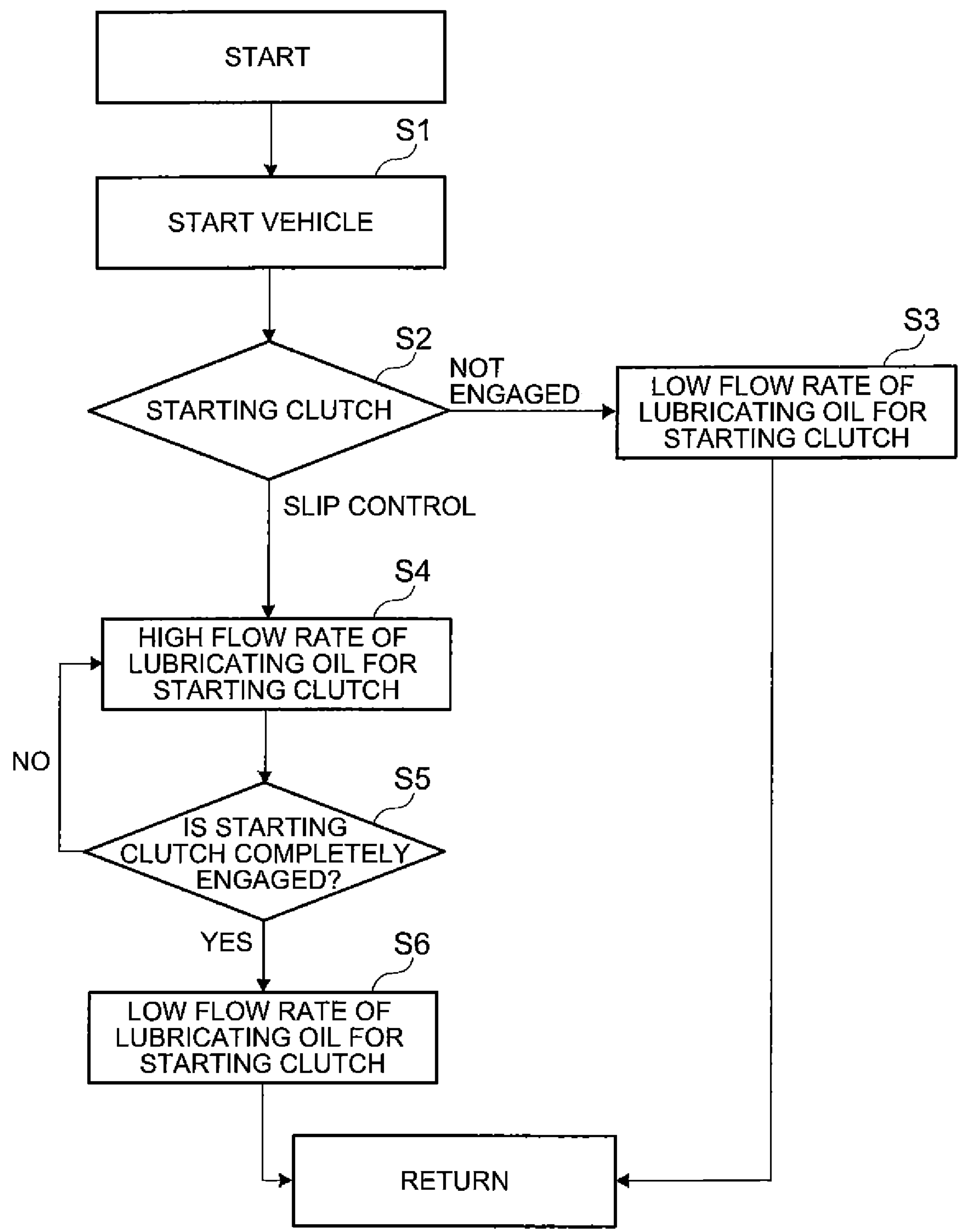
FIG. 4 is a flowchart therefor.

Next, a case where the vehicle is started using the internal combustion engine 5 will be described with reference to FIG. 4.

In the case where the battery remaining amount (SOC) is insufficient, the hybrid drive device 1 starts the vehicle using the internal combustion engine 5 as the drive source. In this event, the K0 clutch 6 functions as the starting clutch. The internal combustion engine 5 is in the rotating state, the shift lever is in the D range, and the automatic transmission device 2 establishes the first speed (S1). In the case where the driver depresses a brake in this state, the K0 clutch 6 as the starting clutch is in the non-engaged (disengaged) state, the switching valve 61 is in the off state, and lubricating oil is supplied at a low flow rate by way of the low-flow rate orifice 64 (S3).

Then, when the driver releases the depression on the brake, a start stand-by state is established, and the starting clutch 6 is subjected to slip control (S2). That is, the working pressure supplied to the hydraulic servo 36 is brought to a creep pressure, and the starting clutch 6 is subjected to slip control to generate creep torque. Then, the solenoid valve 62 is switched on, the switching valve 61 is switched such that the input port a is communicated with the second output port c, and lubricating oil from the pump 27 is supplied to the axial core lubrication 45 via the high-flow rate orifice 65 (S4). The flow rate of lubricating oil supplied to the clutch chamber S via the orifice 65 is higher than the flow rate of lubricating oil discharged from the clutch chamber S through the oil hole 47. The clutch chamber S is filled with lubricating oil, and the clutch 6 is subjected to slip control with the multiple friction plates 35 dipped in the lubricating oil.

When the driver depresses the accelerator with the vehicle in the creep state based on the creep pressure, the working (supply) pressure is raised in accordance with the accelerator operation amount (required torque). The starting clutch 6 increases its torque capacity while being subjected to slip control to start the vehicle, and is then completely engaged (S5). In this state, output torque of the engine is directly transferred to the input shaft 7 of the automatic transmission device 2, and the automatic transmission device 2 is upshifted as appropriate to drive the vehicle. In this event, in general, the battery remaining amount is insufficient. Thus, the electric motor 3 functions as a generator, and generates electric power using power from the internal combustion engine 5.

In the slip control for the starting clutch 6, a high flow rate of lubricating oil is supplied, and the multiple friction plates 35 are dipped in a sufficient amount of lubricating oil to suppress heat generation. In particular, in the case where the driver slowly depresses the accelerator pedal and it takes a long time before the starting clutch 6 is completely engaged, or in the case where the vehicle is in the creep state continuously for a long time such as during starting on an ascending slope, the slip control for the starting (K0) clutch 6 is extended, and lubricating oil in the clutch chamber S becomes hot. Even if the hot lubricating oil flows into the space A through the oil hole 47, the lubricating oil is prevented from directly flowing to the coil end 24*a* in the motor chamber B by the shield portions 50 and 51, and returned from the lower portion of the defined space A to the oil reservoir through the discharge passage 53.

In this event, when the vehicle is stationary in the creep state or at a very slow speed, lubricating oil in the space A flows downward because of the gravity and is stopped by the flanged portion 50. When the vehicle is traveling, lubricating oil in the space A is urged onto the flanged portion 50 by a centrifugal force with the rotor support member 26 rotating, blocked by the projection member 51 which projects in the radially inner direction at the distal end of the flanged portion 50, and hindered from flowing into the motor chamber B and led to the discharge passage 53. In addition, lubricating oil flowing along the cylindrical portion 26*a* of the rotor support member is led from the distal end of the cylindrical portion to the projection member 51 to be received by the flanged portion 50, and discharged through the discharge passage 53 by way of the space A without flowing into the motor chamber B.

When the starting clutch 6 is completely engaged, the solenoid valve 62 is turned off, the switching valve 61 is switched by the spring 63 such that the ports a and b are communicated with each other, and lubricating oil is supplied at a low flow rate via the first orifice 64 (S6).

Although the switching of the flow rate of lubricating oil discussed above has been described in relation to starting by the internal combustion engine with the clutch 6 functioning as the starting clutch, the switching can likewise be applied to slip control for starting the engine for a case where the vehicle is started by the electric motor 3. In addition, the structure in which the shield portions 50 and 51 hinder lubricating oil from flowing to the stator can also be applied to a case where there is no switching mechanism for the flow rate of lubricating oil discussed above.

Figure 5A:
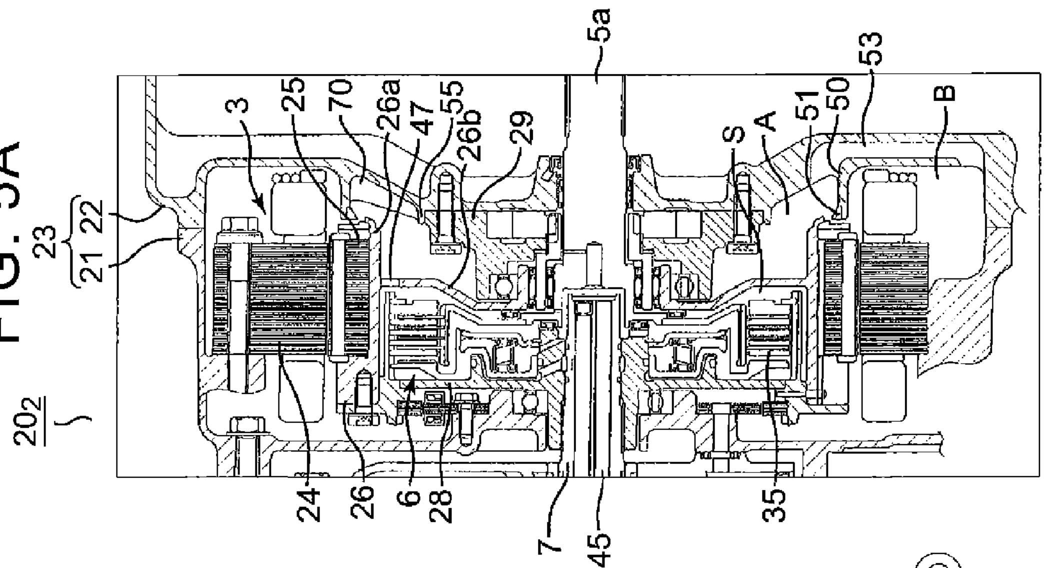
FIG. 5A is a sectional view and FIG. 5B is a side view of a case.
Figure 5B:
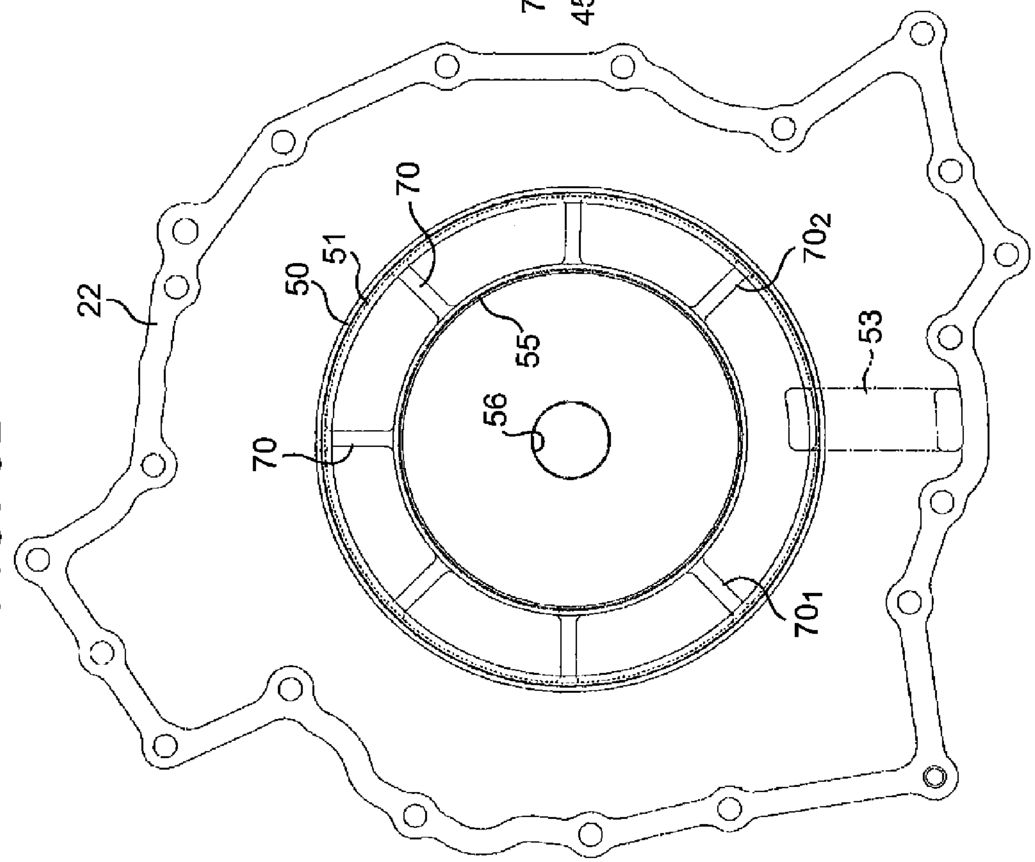
Figure 6A:
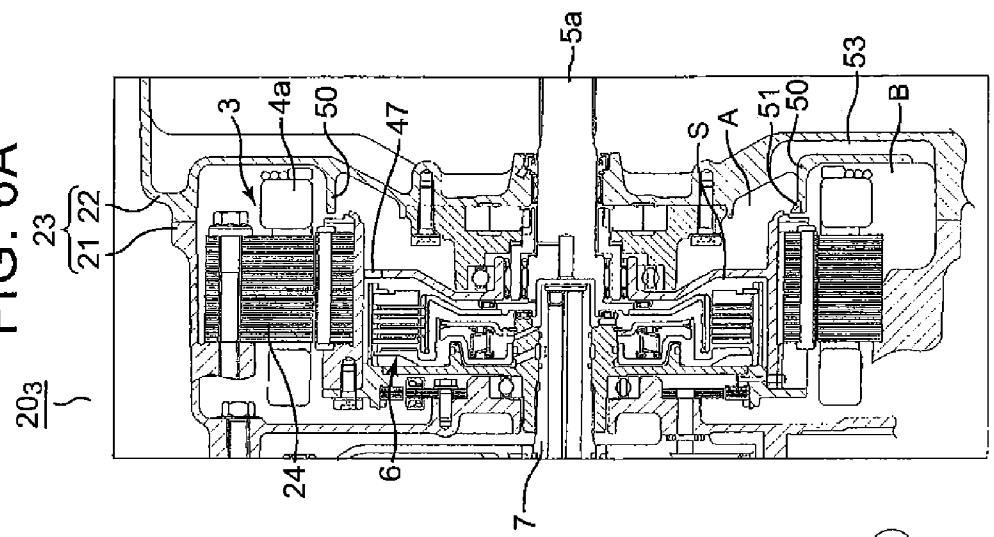
FIG. 6A is a sectional view and FIG. 6B is a side view of a case.
Figure 6B:
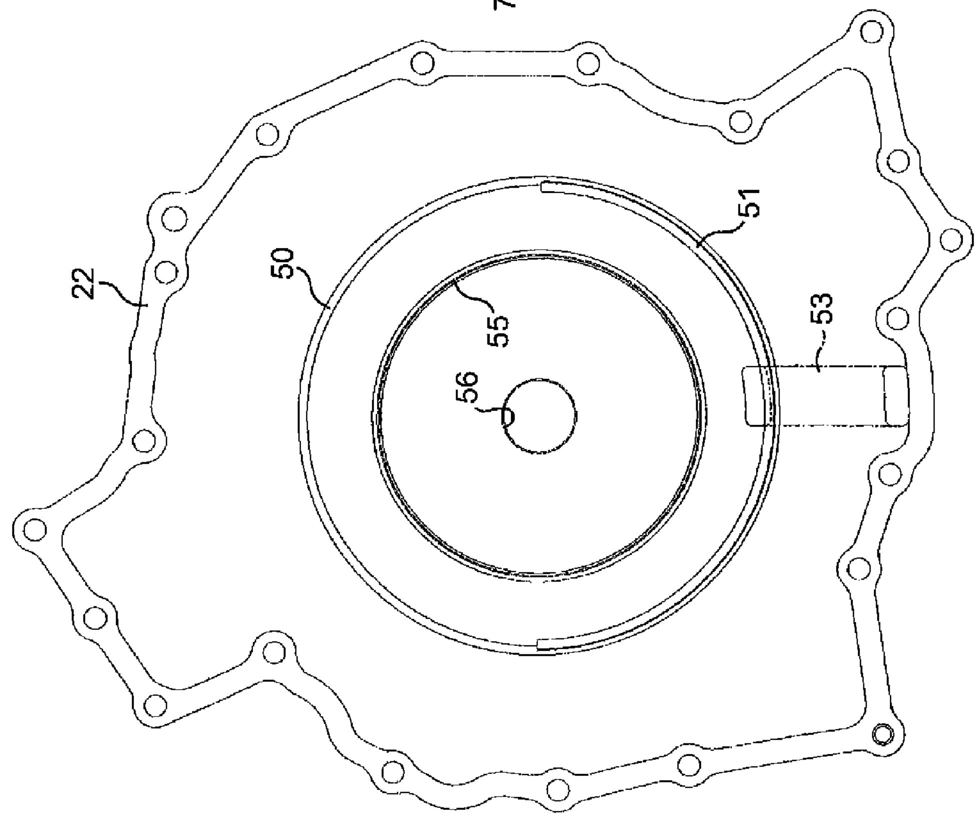
Figure 7A:
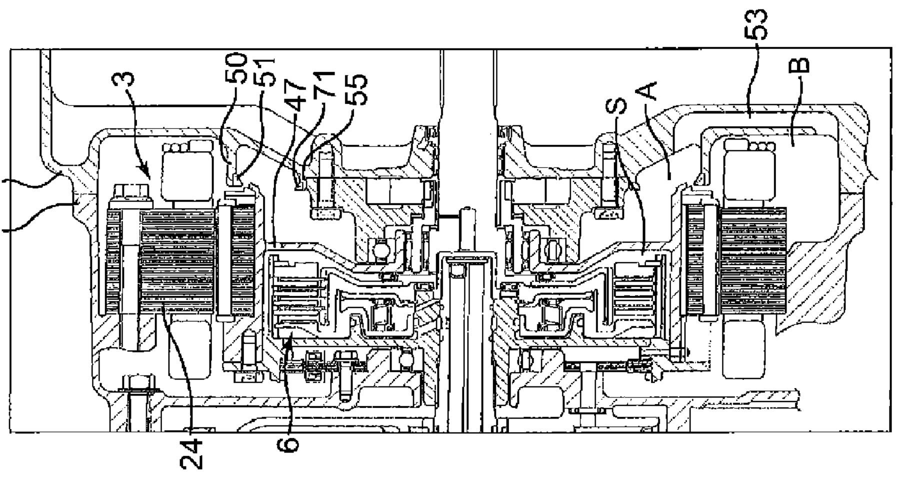
FIG. 7A is a sectional view and FIG. 7B is a side view of a case.
Figure 7B:
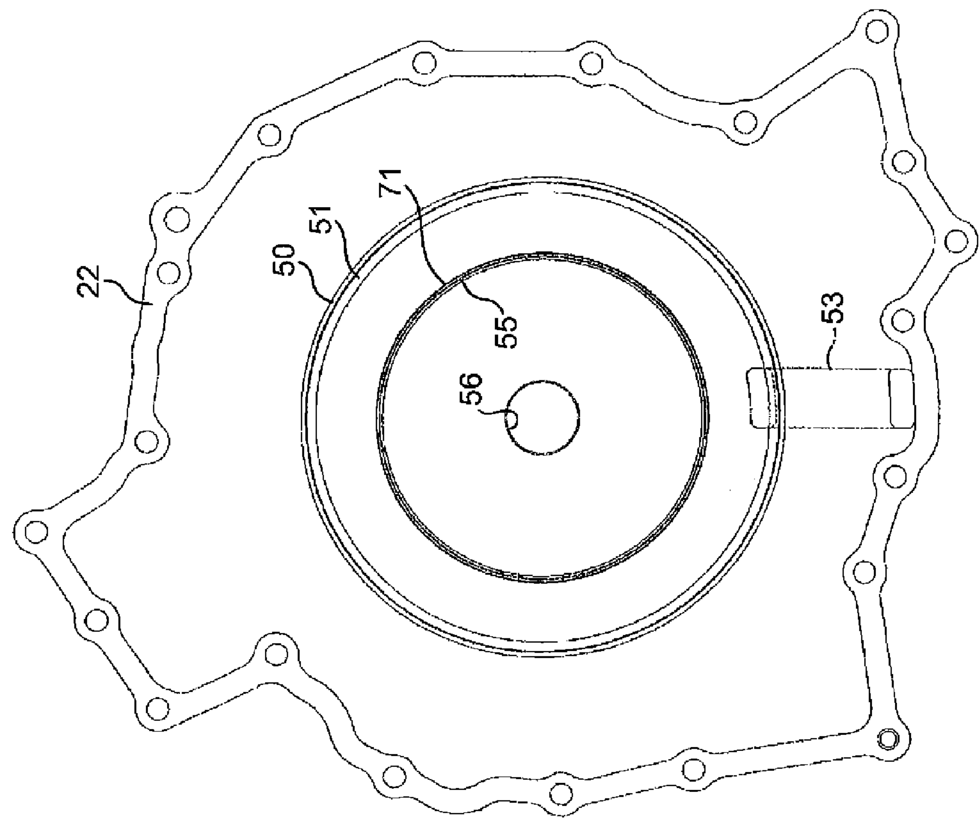

FIGS. 5, 6, and 7 illustrates an embodiment in which the structure of an input portion is partially changed. Because only portions forming the space A are different, descriptions of other portions are omitted and the same reference numerals are given to the main parts of the other portions.

FIG. 5 illustrates an input portion $\mathbf{20_2}$ in which the flanged portion 50 constituting the shield portion is reinforced by ribs 70. The flanged portion 50 is integrally formed with the motor cover 22 from die-cast aluminum or the like. The flanged portion 50 is composed of a relatively thin-walled annular portion. Therefore, it is preferable to improve the rigidity and the strength of the flanged portion 50. Thus, in the input portion $\mathbf{20_2}$, a plurality of ribs 70 . . . that extend radially are formed between the flanged portion 50 and the spigot portion 55 formed coaxially on the radially inner side of the flanged portion 50 to be integrally fitted with the pump case 29. Two lower ribs $\mathbf{70_1}$ and $\mathbf{70_2}$ are formed a predetermined distance away from the discharge passage 53.

Lubricating oil discharged into the space A through the oil hole 47 is blocked by the shield portions 50 and 51 to be smoothly led to the discharge passage 53 by the gravity or a centrifugal force even if the ribs 70 are present in the space A.

FIG. 6 illustrates an input portion $\mathbf{20_3}$ in which the projection member 51 constituting the shield portion is provided only on the lower side. The projection member 51 is constituted by a member that is separate from the flanged portion 50 formed integrally with the motor cover 22. The projection member 51 is formed from a synthetic resin or rubber as with a seal member, and secured to the distal end of the flanged portion 50. A situation where lubricating oil is heated to become hot through the slip control for the clutch 6 occurs when the vehicle is at a very low speed such as during creep. Thus, lubricating oil discharged to the space A flows downward because of the gravity, rather than a centrifugal force. Thus, only a small proportion of lubricating oil flows to the stator 24 in the motor chamber B from the upper side, and the effect discussed above can be achieved sufficiently even if the projection member 51 is mounted only on the lower side.

FIG. 7 illustrates an input portion $\mathbf{20_4}$ in which the spigot portion 55 of the motor cover 22 is provided with a component that is similar to the projection member 51. An annular projection member 71 is integrally mounted to the outer peripheral surface of the spigot portion 55 of the motor cover 22 to project in the radially outer direction. The projection member 71 is preferably made of the same material as that of the projection member 51 constituting the shield portion.

When lubricating oil flowing into the space A through the oil hole 47 is spouted or splashed by a centrifugal force, the lubricating oil may adhere to the inner wall surface of the motor case 23. In this case, lubricating oil in the space A is blocked by the projection member 71, and flows along the spigot portion 55 to be led to the discharge passage 53.

It is desirable that the shield portion should include the projection (member) 51 provided at the distal end of the flanged portion 50. However, the shield portion may include only the flanged portion 50, or may cooperate with a flanged portion that extends toward the motor cover 22 from the distal end of the cylindrical portion 26*a* of the rotor support member.

Figure 8:
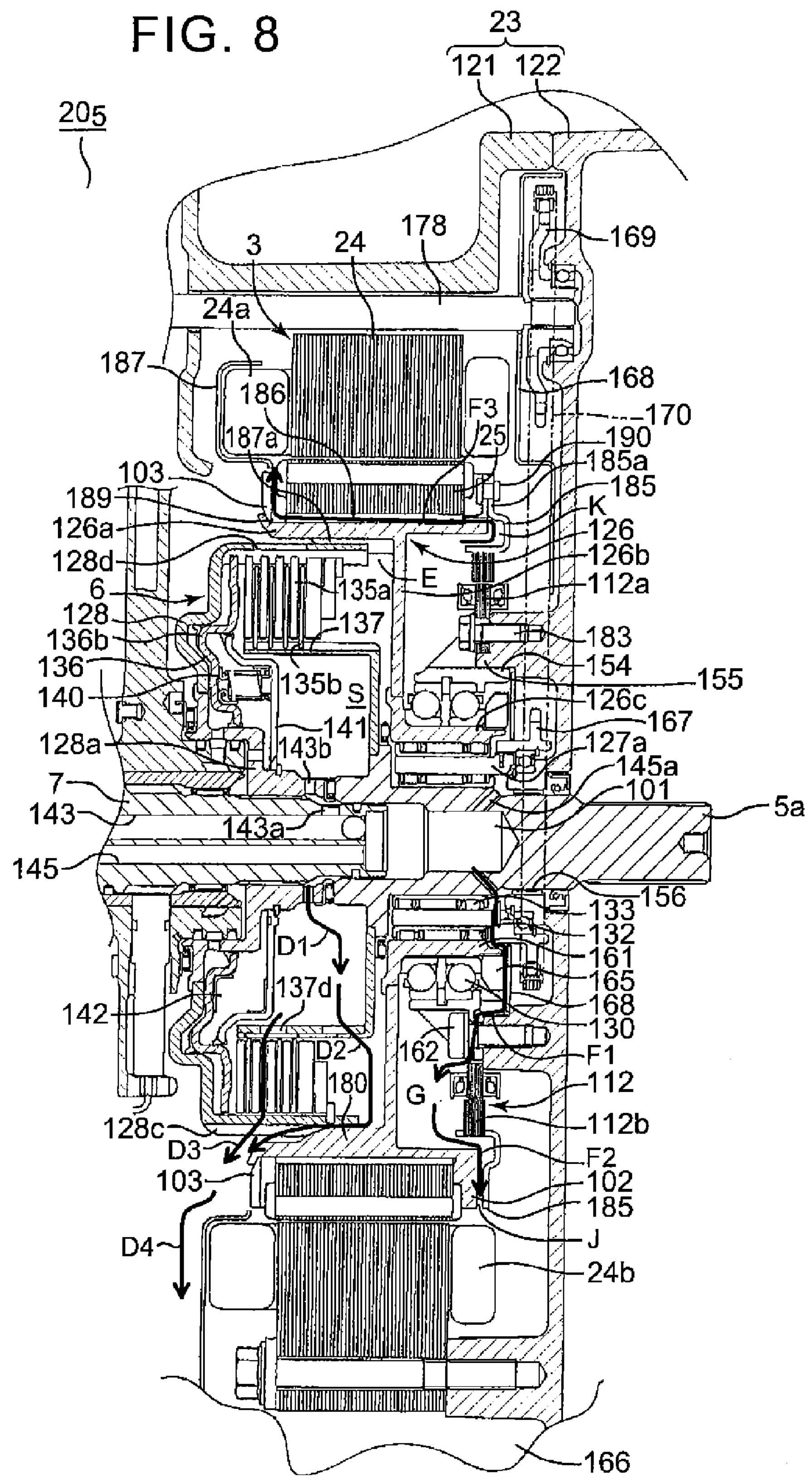
FIG. 8 is a sectional view illustrating an input portion according to another embodiment.

Next, an input portion $\mathbf{20_5}$ according to another embodiment will be described with reference to FIG. 8. In the embodiment, a rotor support member 126 has a cantilever structure, and does not include a flanged portion, a discharge passage, and so forth. The input shaft 7 of the automatic transmission device and the engine output shaft (coupling shaft) 5*a* are disposed at the center portion of the electric motor (rotary electric machine) 3 in alignment with each other. The two shafts are referred to as center shafts. Two oil holes 143 and 145 are formed in the input shaft 7 to extend in parallel with the axial direction. One of the oil holes, 143, is closed at its distal end (on the output shaft side), and opens toward the K0 clutch 6 via transverse holes 143*a* and 143*b*. The other oil hole 145 is communicated at its distal end with a fitting hole 101 and an inclined hole 145*a* formed in the output shaft 5*a*. The inclined hole 145*a* opens toward the electric motor 3. Thus, one of the oil holes serves as a clutch lubricating oil hole 143, and the other oil hole serves as an electric motor (rotary electric machine) lubricating oil hole 145.

The rotor support member 126 includes a cylindrical portion 126*a* that holds the rotor 25, a flange portion 126*b* that extends radially inward from the cylindrical portion, and a hub portion 126*c* integrally fixed to the radially inner end of the flange portion. An end plate 102 is provided at one end of the cylindrical portion 126*a*. The rotor 25 composed of a large number of thin plates is integrally held on the cylindrical portion 126*a* by mounting the rotor 25 to the cylindrical portion 126*a* and caulking the other end of the cylindrical portion 126*a* via a spacer 103.

A spigot portion 155 is coaxially formed on a motor cover 122 of a combined case 123, which is composed of a transmission case 121 and the motor cover 122, so as to surround a center hole 156. A cylindrical bearing holder 154 is fixed to the spigot portion by a bolt 162. The rotor support member 126 is rotatably supported in a cantilever manner via an angular contact ball bearing 130 interposed between the radially inner side of the bearing holder 54 and the radially outer side of the hub portion 126*c*. The ball bearing 130 is fastened by a nut 165 to be positioned in the axial direction and mounted.

A cylindrical pump drive member 127*a* is interposed between the radially inner surface of the hub portion 126*e* and the output shaft 5*a*. One-way clutches 132 and 133 are provided on the radially outer side and the radially inner side, respectively, of the pump drive member 127*a*. Thus, the faster one of rotation of the electric motor 3 and rotation of the internal combustion engine is transferred to the pump drive shaft 127*a* via the one-way clutch 132 or 133. The pump drive shaft 127*a* is coupled to a drive sprocket 167 rotatably supported on the output shaft 5*a* through a bearing. A driven sprocket 169 is rotatably supported on the radially outer side of the motor cover 122. A chain 170 is wound between the sprockets 167 and 169. A shaft 178 coupled to the driven sprocket 169 extends on the radially outer side of the stator 24 of the electric motor 3 toward the automatic transmission device, and is coupled to an oil pump (not illustrated). A cover 168 is provided to cover of the drive sprocket 167, the driven sprocket 169, and the chain 170. The chain power transfer device is housed between the cover 168 and the motor cover 122.

The K0 clutch 6 is disposed on the automatic transmission device (one) side, in the axial direction, of the flange portion 126*b* of the rotor support member 126 and on the radially inner side of the cylindrical portion 126*a*. The K0 clutch 6 has a clutch drum 128 coupled to the input shaft 7, a clutch hub 137 coupled to the output shaft 5*a*, a number of outer friction plates 135*a* splined to the clutch drum, inner friction plates 135*b* splined to the clutch hub, and a hydraulic servo 136 that engages and disengages the friction plates with and from each other. The clutch drum 128 is in the shape of a bowl that is closed on one (automatic transmission device) side and that is open on the flange portion 126*b* side. A hub portion 128*a* of the clutch drum 128 on the closed side is splined to the input shaft 7. The hydraulic servo 136 is constituted from a cylinder that is the closed side of the clutch drum 128, and a piston 136*b* oil-tightly fitted with the cylinder. A return spring 140 is interposed and a cancellation oil chamber 142 is formed between the back surface of the piston and a back plate 141 retained on the hub portion 128*a*. The clutch hub 137 is integrally fixed to an expanded diameter portion of the output shaft 5*a*.

The clutch lubricating oil hole 143 opens (143*b*) into the clutch chamber S formed by the clutch drum 128 and the rotor support member 126, more particularly the space S formed by the clutch hub 137. A large number of spline projections 180 are formed on the radially inner side of the cylindrical portion 126*a* of the rotor support member 126. The projections are engaged with splines 128*c* formed on the outer peripheral surface of the clutch drum 128 to rotate together therewith. A gap E is formed between the distal end portion of the clutch drum 128 and the flange portion 126*b* of the rotor support member. In addition, oil passages are formed between the splines 128*c* on the outer peripheral surface of the drum and the cylindrical portion 126*a*. A through hole 128*d* is formed in the outer peripheral surface of the clutch drum 128. In addition, a through hole 137*d* is formed in the clutch hub 137.

The electric motor lubricating oil hole 145 opens (145*a*) toward a space G on the motor cover 122 side of the flange portion 126*b* of the rotor support member 126. Lubricating oil from the opening (145*a*) of the lubricating oil hole 145 is supplied to the space G through a gap between the nut 165 and the cover 168 as indicated by the arrow F1. A resolver (rotational speed sensor) 112 that detects the rotational speed and the phase of the electric motor 3 is disposed in the space G. The resolver is composed of a stator 112*a* fixed to the motor cover 122 (combined case 123) by a bolt 183, and a rotor 112*b* fixed to the rotor support member 126 via a bracket 185. The stator 112*a* and the rotor 112*b* are disposed in proximity to each other.

Figure 9:
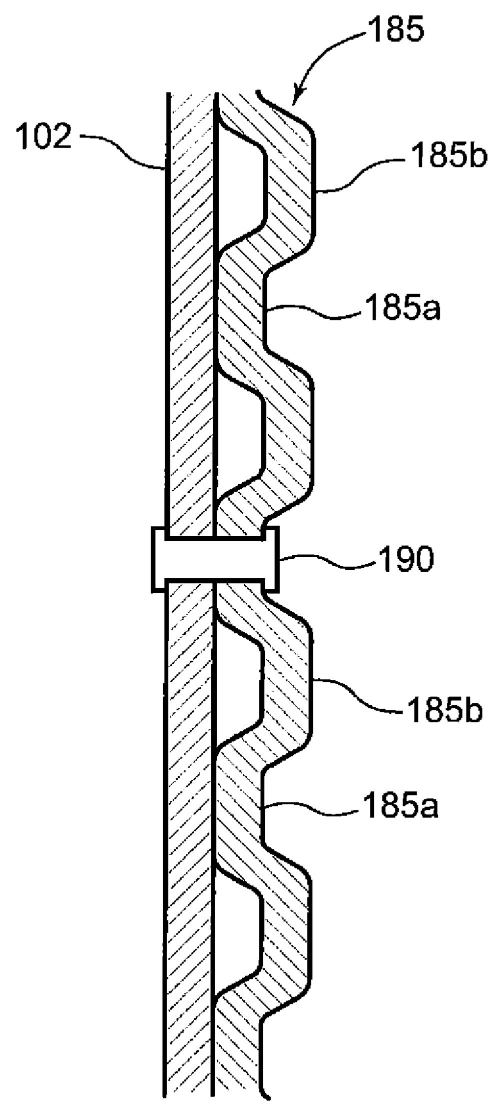
FIG. 9 is a plan view illustrating a bracket for attachment of a rotary element of a resolver to a rotor support member.

The radially outer side of the bracket 185 is fixed to the end plate 102 of the cylindrical portion 126*a*. The radially inner side of the bracket 185 is fixed to the rotor 112*b*. As illustrated in FIG. 9, the bracket 185 is formed to be projected and recessed over the entire circumference. The bracket 185 is fixed to the end plate 102 by a rivet 190 at a recessed portion 185*a* (upper half of FIG. 8). A void portion J is formed between the end plate 102 and the bracket 185 at a projected portion 185*b* (lower half of FIG. 8). In addition, the radially inner portion of the bracket is bent in an angular U shape, and a void portion K is formed between one end of the cylindrical portion 126*a* and the radially inner portion of the bracket.

A recessed groove is formed in the radially inner surface of the rotor 25, which is composed of a large number of thin plates, to penetrate in the axial direction. The recessed groove forms an oil passage 186 between the outer peripheral surface of the cylindrical portion 126*a* of the rotor support member 126 and the rotor 25. The oil passage 186 extends from one end toward the other end of the cylindrical portion 126*a*. The oil passage 186 is communicated at the other end with an oil passage 189 formed in the spacer 103 to open in the radially outer direction of the rotor 25.

The coil end 24*a* disposed on one side of the stator 24 of the electric motor 3 is covered over the entire circumference by a cover member 187 that constitutes a shield portion that extends along the outer shape of the coil end 24*a*. The radially inner portion of the cover member forms a flanged portion 187*a* that hangs in the radially inner direction to receive lubricating oil from the oil passage 189 into the cover member and guide lubricating oil flowing along the outside surface of the spacer 103 to the outside of the cover member. The cover member 187 is formed from a synthetic resin, and electrically insulates the coil end 24*a* to shorten the insulation distance between the case 121 and the coil end 24*a*. This enables downsizing, in particular downsizing in the axial direction, of the hybrid drive device 1.

Next, the effect of the input portion $\mathbf{20}_5$ discussed above will be described. Lubricating oil from the clutch lubricating oil hole 143 is supplied from the transverse holes 143*a* and 143*b* (openings) to the clutch chamber (space) S as indicated by the arrow Dl. Further, the lubricating oil lubricates and cools the outer friction plates 135*a* and the inner friction plates 135*b*, and is discharged out of the clutch drum 128 through the through hole 128*d* as indicated by the arrow D3. Meanwhile, a part of lubricating oil in the clutch chamber S passes through the gap E on the open side and the splines 128*c*, and is discharged toward one end of the cylindrical portion 126*a*.

This allows clutch lubricating oil supplied through the axial core lubrication (143) to be continuously supplied to the K0 clutch 6 and continuously discharged. It is possible to prevent the K0 clutch 6 from becoming excessively hot even if the K0 clutch 6 is subjected to slip control to be heated, and to reduce drag of the K0 clutch 6 due to lubricating oil in clutch chamber S continuously flowing.

Lubricating oil discharged out of the clutch drum 128 is blocked by the cover member 187 as indicated by the arrow D4, and hindered from flowing to the coil end 24*a*. In addition, lubricating oil flowing along the inner peripheral surface of the cylindrical portion 126*a* is led to the outside of the cover member 187 by the spacer 103 and the flanged portion 187*a*, and discharged to an oil reservoir 166 without flowing to the coil end 24*a*. Lubricating oil in the clutch chamber S is blocked by the rotor support member 126 and does not flow into the space G on the motor cover 122 side. In addition, by use of the valve 61 illustrated in FIG. 3 the flow rate of lubricating oil through the clutch lubricating oil hole 143 may be a low flow rate in the case where the K0 clutch is in the disengaged or completely engaged state, and may be a high rate in the case where the K0 clutch is in the slip state. It is a matter of course that the valve 61 is not necessarily used.

Lubricating oil from the electric motor lubricating oil hole 145 is supplied from the fitting hole 101 and the inclined hole (opening) 145*a* to the space G on the motor cover side separated by the flange portion 126*b* as indicated by the arrow F1. The resolver 112 is disposed in the space G, the K0 clutch 6 is disposed on the automatic transmission device (one) side of the flange portion 126_b_, and the oil pump is disposed on the radially outer side of the case 121. These all contribute to downsizing the hybrid drive device by effectively and reasonably utilizing the space, but hinders a smooth flow of lubricating oil from the space G to the electric motor 3.

The bracket 185 to which the rotor 112_b_ of the resolver 112 is attached is shaped to be projected and recessed. Thus, lubricating oil in the space G is supplied to the coil end 24_b_ disposed on the motor cover (other) side of the stator 24 through the void J (see the lower portion of FIG. 8 and FIG. 9) to lubricate and cool the coil end 24_b_. On the other hand, lubricating oil from the void K on the bracket 185 is blocked from flowing in the radially outer direction by fixing the bracket 185 to the end plate 102 at the recessed portion 185_a_ (see the upper portion of FIG. 8 and FIG. 9) as indicated by the arrow F3, and led through the oil passage 186 to flow toward one side of the rotor 25 in the axial direction. Then, the lubricating oil flows in the radially outer direction through the oil passage 189 at the end of the rotor 25 on the automatic transmission device side, is led by the flanged portion 187_a_ to be supplied to the coil end 24_a_ on one side inside the cover member 187, and lubricates and cools the coil end 24_a_ on one side to be discharged to the oil reservoir 166.

INDUSTRIAL APPLICABILITY

The present invention is utilized for a hybrid drive device to be mounted on an automobile, and in particular utilized as a lubricating device for a hybrid drive device having one motor in addition to an internal combustion engine.

DESCRIPTION OF THE REFERENCE NUMERALS

1 HYBRID DRIVE DEVICE
2 AUTOMATIC TRANSMISSION DEVICE
3 ROTARY ELECTRIC MACHINE (ELECTRIC MOTOR)
5 INTERNAL COMBUSTION ENGINE
5_a_ OUTPUT SHAFT (MEMBER)
6 (K0) CLUTCH
7 INPUT SHAFT (MEMBER)
22, 122 CASE (MOTOR COVER)
23, 123 CASE
24 STATOR
24_a_ COIL END
25 ROTOR
26, 126 ROTOR SUPPORT MEMBER
26_a_, 126_a_ CYLINDRICAL PORTION
26_b_, 126_b_ (FIRST) FLANGE PORTION
28 (SECOND) FLANGE PORTION
126_c_ HUB
47 OIL HOLE
50 SHIELD PORTION (FLANGED PORTION)
51 SHIELD PORTION [PROJECTION (MEMBER)]
53 DISCHARGE PASSAGE (BYPASS OIL PASSAGE)
61 (SWITCHING) VALVE
66, 166 OIL RESERVOIR
70 RIB
128 CLUTCH DRUM
128_c_ SPLINE
128_d_ THROUGH HOLE
130 BEARING
135_a_ OUTER FRICTION PLATE
135_b_ INNER FRICTION PLATE
136 HYDRAULIC SERVO
187 SHIELD PORTION (COVER MEMBER)

The invention claimed is:

1. A hybrid drive device comprising:

a clutch that engages and disengages an output member of an internal combustion engine and an input shaft of an automatic transmission device with and from each other;

a rotary electric machine that has a stator fixed to a case and a rotor coupled to the input shaft of the automatic transmission device, and a rotor support member that has a cylindrical portion that holds the rotor, a flange portion that extends radially inwardly from the cylindrical portion, and a hub portion supported on the case via a bearing at a radially inner end portion of the flange portion, wherein:

the rotary electric machine is disposed radially outwardly of the clutch so as to at least partially overlap the clutch in an axial direction as seen from a radial direction;

lubricating oil is supplied from the input shaft of the automatic transmission device to the clutch;

the hybrid drive device includes a shield portion that allows the lubricating oil to bypass the rotary electric machine and leads the lubricating oil supplied to the clutch to an oil reservoir, the shield portion being a cover member that covers a coil end disposed on one side of the stator;

the clutch is disposed on one side of the flange portion in the axial direction and radially inwardly of the cylindrical portion; and the lubricating oil from the input shaft is supplied to the clutch, and further led by the cylindrical portion and the cover member to be discharged to the oil reservoir.

2. A hybrid drive device comprising:

a clutch that engages and disengages an output member of an internal combustion engine and an input shaft of an automatic transmission device with and from each other, lubricating oil being supplied from the input shaft of the automatic transmission device to the clutch;

a rotary electric machine that has a stator fixed to a case and a rotor coupled to the input shaft of the automatic transmission device, the rotary electric machine being disposed radially outwardly of the clutch so as to at least partially overlap the clutch in an axial direction as seen from a radial direction;

a rotor support member that supports the rotor and that has an oil hole through which the lubricating oil supplied to the clutch flows out;

a shield portion that allows the lubricating oil to bypass the rotary electric machine; and a discharge passage through which the lubricating oil flowing out through the oil hole is discharged to an oil reservoir, the shield portion leading the lubricating oil flowing out through the oil hole to the discharge passage, wherein the lubricating oil flowing out through the oil hole bypasses the rotary electric machine and is discharged to the oil reservoir through the shield portion and the discharge passage.

3. The hybrid drive device according to claim 2, wherein:

the rotor support member has a cylindrical portion to which the rotor is mounted, and first and second flange portions that extend in a radially inner direction from the cylindrical portion, the first flange portion having the oil hole formed in a radially outer portion thereof;

a clutch chamber that houses the clutch is formed between the first and second flange portions of the rotor support member; and the lubricating oil is supplied from the input shaft toward the clutch chamber.

4. The hybrid drive device according to claim 3, further comprising:

a valve that switches a flow rate of the lubricating oil to be supplied to the clutch between a high flow rate and a low flow rate, wherein the oil hole in the rotor support member is set such that the lubricating oil flows out through the oil hole at a flow rate that is lower than the high flow rate and higher than the low flow rate.

5. The hybrid drive device according to claim 2, wherein the shield portion has an annular flanged portion that projects in the axial direction from the case, and a projection provided at a distal end of the flanged portion in at least a lower portion of the flanged portion to project in a radially inner direction so as to be proximate to a distal end of the cylindrical portion of the rotor support member.

6. The hybrid drive device according to claim 5, wherein the projection is disposed radially outwardly of the distal end of the cylindrical portion of the rotor support member so as to at least partially overlap the distal end of the cylindrical portion of the rotor support member as seen from the radial direction.

7. The hybrid drive device according to claim 2, wherein:

the shield portion has an annular shape, and a space defined by the shield portion, the rotor support member, and the case is formed; and the discharge passage is formed in the case with an upper end of the discharge passage opening in a bottom portion of the space, and the lubricating oil flowing into the space through the oil hole flows into the discharge passage through the opening.

8. The hybrid drive device according to claim 2, wherein the shield portion has a flanged portion integrally formed with the case, and ribs formed to extend radially inwardly of the flanged portion.

9. The hybrid drive device according to claim 1, wherein:

the clutch has a clutch drum coupled to the input shaft, a clutch hub coupled to the output member, outer friction plates splined to the clutch drum, inner friction plates splined to the clutch hub, and a hydraulic servo disposed in the clutch drum to engage and disengage the outer friction plates and the inner friction plates with and from each other;

an outer peripheral surface of the clutch drum is formed with splines and a through hole, and the cylindrical portion of the rotor support member is engaged with the clutch drum through the splines so as to rotate together with the clutch drum; and the lubricating oil from the input shaft flows out of the clutch drum through a gap between a distal end of the clutch drum and the flange portion, the splines, and the through hole, and is further led by the cover member to be discharged to the oil reservoir.

10. The hybrid drive device according to claim 1, further comprising:

a valve that switches a flow rate of the lubricating oil to be supplied to the clutch between a high flow rate and a low flow rate, wherein:

the clutch is controlled to a disengaged state, a slip state, and a completely engaged state; and the valve is switched to the low flow rate when the clutch is in the disengaged state and the completely engaged state, and to the high flow rate when the clutch is in the slip state.

11. The hybrid drive device according to claim 2, further comprising:

a valve that switches a flow rate of the lubricating oil to be supplied to the clutch between a high flow rate and a low flow rate, wherein:

the clutch is controlled to a disengaged state, a slip state, and a completely engaged state; and the valve is switched to the low flow rate when the clutch is in the disengaged state and the completely engaged state, and to the high flow rate when the clutch is in the slip state.

* * * * *